(12) United States Patent
Muthya

(10) Patent No.: US 6,807,543 B2
(45) Date of Patent: Oct. 19, 2004

(54) DATA ACCESS COMPONENT PROVIDING TRANSPARENT ACCESS TO A PLURALITY OF MEDICAL IMAGING DATABASES

(75) Inventor: Srikantha Muthya, Bangalore (IN)

(73) Assignee: GE Medical Technology Services, Inc., Pewaukee, WI (US)

(*) Notice: Subject to any disclaimer, the term of this patent is extended or adjusted under 35 U.S.C. 154(b) by 418 days.

(21) Appl. No.: 09/682,244

(22) Filed: Aug. 9, 2001

(65) Prior Publication Data

US 2003/0033268 A1 Feb. 13, 2003

(51) Int. Cl.$^7$ .............................................. G06F 17/30
(52) U.S. Cl. .................. 707/10; 707/103 R; 707/102; 707/2; 714/4; 709/219; 379/221.08; 345/783; 219/216
(58) Field of Search ............................ 707/1, 102, 10, 707/103 R, 2; 714/4; 219/216; 345/783; 709/219; 379/221.08

(56) References Cited

U.S. PATENT DOCUMENTS

| | | | |
|---|---|---|---|
| 5,416,835 A | * 5/1995 | Lee ........................ 379/221.08 |
| 5,452,416 A | * 9/1995 | Hilton et al. ................ 345/783 |
| 5,553,303 A | * 9/1996 | Hayashi et al. ................. 707/2 |
| 6,134,671 A | * 10/2000 | Commerford et al. ......... 714/4 |
| 6,564,336 B1 | * 5/2003 | Majkowski .................... 714/4 |
| 2001/0050610 A1 | * 12/2001 | Gelston ..................... 340/5.53 |
| 2002/0073173 A1 | * 6/2002 | Selvakumar ................ 709/219 |
| 2002/0087503 A1 | * 7/2002 | Judd et al. ..................... 707/1 |

FOREIGN PATENT DOCUMENTS

WO WO0033157 * 6/2000 .......... G06F/17/30

* cited by examiner

*Primary Examiner*—Frantz Coby
(74) *Attorney, Agent, or Firm*—Fletcher Yoder

(57) ABSTRACT

A technique is provided for accessing data stored in separate databases. A communication system having a first and second computer system is used to retrieve data from a primary or a secondary database. The primary and secondary databases are coupled to the first computer system. A data access controller is used in the system to automatically shift the first computer system from retrieving data from the primary database to retrieving data from the secondary database. The data access controller shifts when a communication error between the primary database and the first computer system is detected by the system.

34 Claims, 2 Drawing Sheets

DATA ACCESS COMPONENT PROVIDING TRANSPARENT ACCESS TO A PLURALITY OF MEDICAL IMAGING DATABASES

BACKGROUND OF INVENTION

The present invention relates generally to communication systems and, more particularly, to communication systems that enable diagnostic tools to be used to identify and/or repair problems associated with a device located at a remote location. Even more particularly, the present invention relates to a communication system for a medical imaging system that detects when there is a communication problem when retrieving data from a primary database and that automatically accesses data from a back-up database.

Today, many electronic devices, such as medical imaging systems, have the ability to communicate with other electronic devices, such as computers, located a great distance from the electronic device. These devices may be connected to the Internet or some other communication system that enables them to communicate with other electronic devices. Communication may be established with the devices for many reasons. For example, a medical imaging system may be connected to a communication system to enable an engineer working at a remote location to identify or repair a problem associated with the medical imaging system. The engineer could access the medical imaging system over the Internet to retrieve data from the device, such as a poor quality medical image taken by the medical imaging system. The engineer"s computer may have an image enhancement program that may be used to improve the quality of the image. Alternatively, a diagnostic program on the engineer"s computer may communicate with the medical imaging system to identify the cause of the poor image quality. Additionally, an engineer or technician may use the communication system to supply data to the device, such as a programming repair or upgrade.

A manufacturer may sell devices, such as medical imaging systems, to customers located around the world. A system to enable a manufacturer to communicate with products located around the world may take many forms. The system may vary depending, for example, on the type of product, the information to be communicated, and the location of engineers or technicians to repair the product. One system that may be used is to have a number of satellite communication centers coupled to a central system. The satellite communication centers could be located in various locations around the world and staffed by engineers and other technicians. For example, a satellite communication system could be located close to a large concentration of products, making a visit to the product when necessary to repair the product much easier. Additionally, customers around the world speak many languages and have different cultures. Therefore, having engineers that can speak with customers in their own language, who are familiar with local customs, and who are located relatively close to the customers so that they can respond quickly, can make it much easier to solve the customer"s problems. The central system may serve as the primary archive for data that may be used by all of the satellite centers and as the warehouse for large quantities of data. For example, all medical images uploaded into the system may be stored in the central system. The communication centers may communicate with databases maintained in the central system to store and/or retrieve data as needed to perform various functions, such as identifying and/or repairing problems associated with the device.

However, breakdowns in communication between the communication centers and the central system may occur. In this event, the communication system functions may be degraded significantly. Indeed, the system may not be able to function at all. There is a need, therefore, for a method to improve access to data to enable communication with remote devices to continue uninterrupted when there is a communication failure between some of the elements of a communication system. Furthermore, it is also desirable to provide a system that has the ability to switch a user between communicating with a database in a first system to communicating with a database in a second system. Additionally, it is desirable that the switch between databases is automatic and performed in a manner that is transparent to the user.

SUMMARY OF INVENTION

The invention provides a novel technique for accessing data stored in separate databases. According to one aspect of the present technique, a communication system having first and second computer systems is used to retrieve data from a primary or a secondary database. The primary and secondary databases are coupled to the first computer system. A data access controller is used in the system to automatically shift the first computer system from retrieving data from the primary database to retrieving data from the secondary database. The data access controller shifts when a communication error between the primary database and the first computer system is detected by the system.

According to another aspect of the present technique, a computer program is used to direct a first computer system to verify communication with a primary source of data accessible via a second computer system. The computer program also directs the first computer system to access data from a secondary source of data when communication between the primary source of data and the first computer system is not verified.

According to another aspect of the present technique, a method is used to operate a communication system. As part of the method, a first set of data is stored in a primary database stored in a first computer system. A second set of data is stored in a secondary database. An application is coupled to the primary database or the secondary database via a data access controller stored in a second computer system. The data access controller is configured to normally couple the application to the primary database. Communication is verified between the second computer system and the primary database. The data access controller is automatically operated to couple the application to the secondary database when communication between the second computer system and the primary database is not verified.

According to another aspect of the present technique, a method is used to operate a communication system. As part of the method, a first database is stored in a first computer system. The first computer system is coupled to a second computer system. The second computer system is, in turn, coupled to a second database. The communication system is accessed via the second computer system. Data is retrieved from the communication system via a data access controller operable to couple the second computer system to one of the first and second databases.

BRIEF DESCRIPTION OF DRAWINGS

The foregoing and other advantages of the invention will become apparent upon reading the following detailed description with reference to the drawings in which.

DETAILED DESCRIPTION

In the discussion that follows, a system and method for assisting customers to diagnose and/or repair problems associated with a medical imaging system is described. However, the present invention is not limited to assisting customer's diagnose and/or repair problems or to medical imaging systems.

Figure 1:
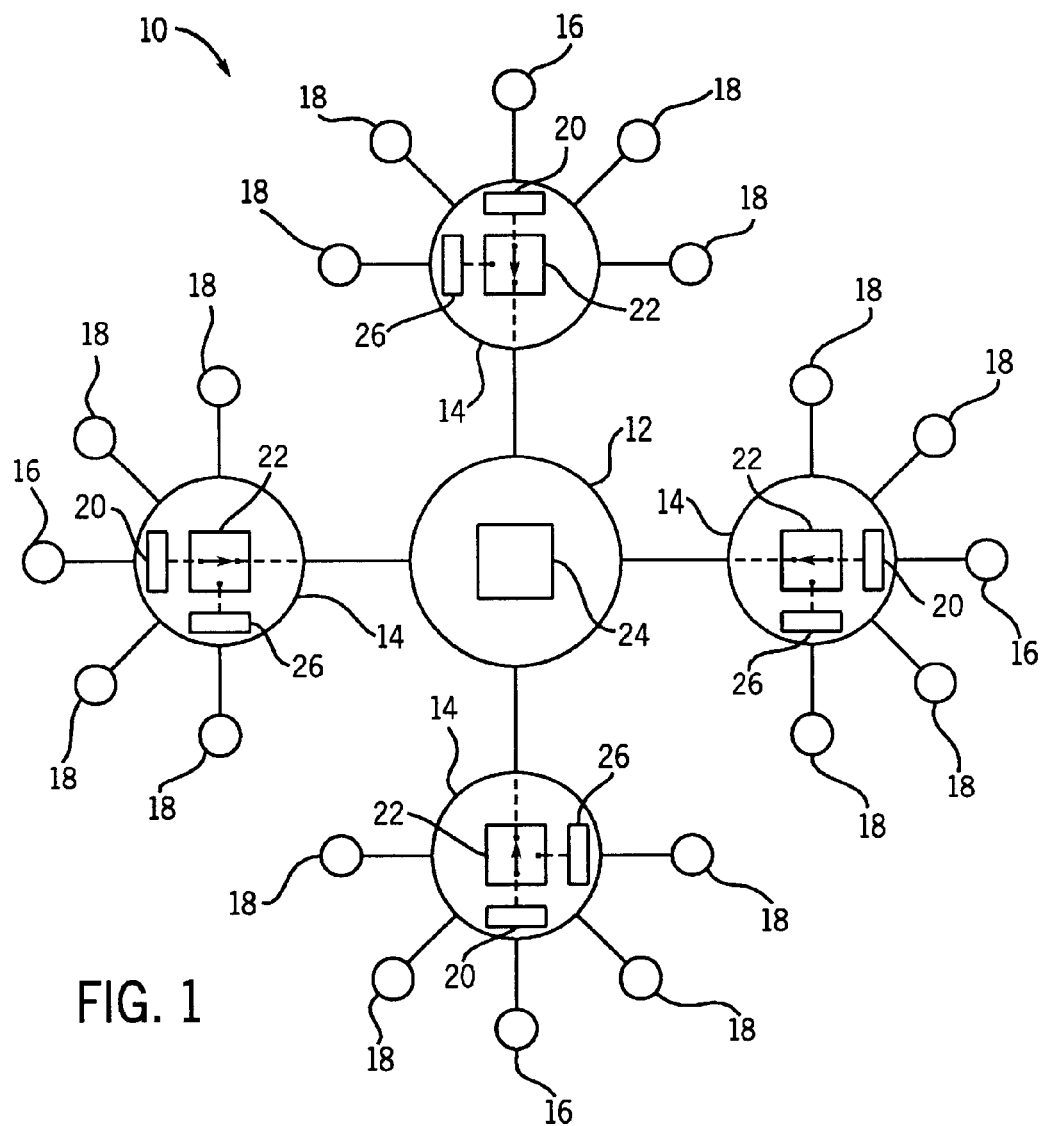
FIG. 1 is a diagrammatical overview of a system that enables an online engineer to diagnose and/or repair problem conditions for a remote medical imaging system, according to an exemplary embodiment of the present invention.

Referring generally to FIG. 1, a data access system 10 is illustrated to facilitate remote support of medical equipment. The system 10 provides an engineer or technician with the ability to remotely service and repair medical equipment. For example, an engineer may use system 10 to remotely execute individual diagnostic tests on the medical equipment. The system 10 is comprised of many software programs operating on a hardware infrastructure. The system 10 utilizes a primary data storage facility 12 electronically linked to a plurality of local support facilities 14. The local support facilities may all be located in one country or located around the world. Each local support facility 14 comprises one or more servers that are operable to link a computer system 16 used by an engineer or technician to one or more databases. A computer system 16 may be a digital assistant, a notebook computer, desktop computer, workstation, or other computing device. Each computer system 16 is coupled to the local support facilities 14 via a communication connection, such as the Internet or an Intranet. In the illustrated embodiment, a plurality of customer facilities 18 are coupled to each local support facility 14 via a communication connection, such as a PPP connection, a SLIP connection, a persistent network connection, an ISDN network, Telnet, or the Internet.

In the illustrated embodiment, engineers or technicians access a local support facility 14 through an interface 20. The interface 20 couples the computer system 16 to a data access controller 22. In the exemplary embodiment, the data access controller 22 is a computer program stored on a server at each local support facility 14. The data access controller couples data from the computer system 16 to a primary data storage system 24 located at the primary data storage facility 12. In the illustrated embodiment, if there is a communication failure between the primary database 24 and the local support facility 14, the data access controller 22 automatically retrieves data from a back-up database 26 so that operation of the system may continue. When communication between the primary database 24 and the local support facility returns, the data access controller 22 automatically shifts from retrieving data from the back-up database 26 to retrieving data from the primary database 24. However, the data access controller may be configured to wait for a prompt from an operator before shifting back to accessing data from the primary database 24 after being shifted to the back-up database 26. Additionally, an exemplary communication system 10 is configured so that an operator is not aware that any shift in retrieving data between databases has occurred. However, the system 10 may be configured to provide an indication that a shift between databases has occurred.

Figure 2:
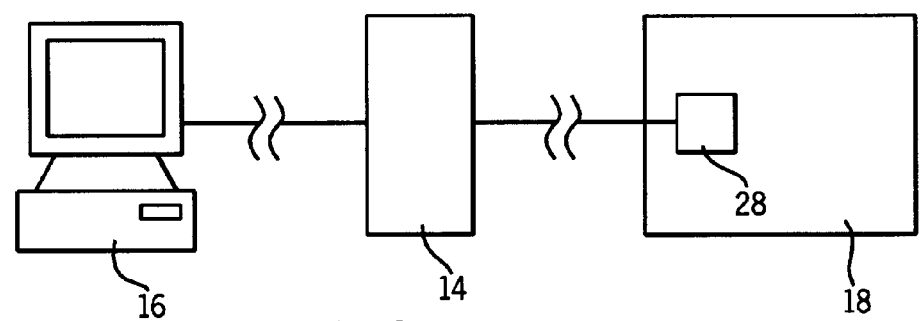
FIG. 2 is a diagrammatical representation illustrating an online engineer accessing a remote medical imaging system using the system of FIG. 1.

As illustrated in FIG. 2, an engineer's computer system 16 is coupled to a customer's facility 18 via the local support facility 14. In the illustrated embodiment, the engineer's computer system 16 is coupled to a medical imaging system 28 located at the customer's facility 18. However, the computer system 16 may communicate with devices other than medical imaging systems 28. In an exemplary embodiment, each computer system 16 has applications that enable an engineer to access the medical imaging systems 28 and diagnose and/or repair problems associated with the medical imaging system 28. For example, an engineer may download a distorted medical image taken by a medical imaging system 28 to a computer system 16 for analysis. A diagnostic program stored in the computer 16 may be executed to determine if the medical imaging system is defective or an image enhancement program may be executed to improve the distorted image. Alternatively, these applications can be stored at the local support facilities 14 or the primary data storage facility 12 and executed at the direction of the engineer or technician.

In the illustrated embodiment, an archive of medical imaging system data is maintained in the primary data storage system 24. The medical imaging system data may include a record of the type and configuration of each medical imaging system connected to the system, an archive of medical images taken by the medical imaging systems, and other medical imaging system data. Additionally, logs may be maintained for each medical imaging system, such as a log of all problems associated with a medical imaging system and a log of all remote connections made with the medical imaging system. The medical imaging system data also may provide electronic copies of documentation, such as technical manuals and service order forms. In an exemplary embodiment, the back-up data system 26 contains data stored in a database in a flat file format. The flat files are a sub-set of the data stored in the primary data storage system 24. The data in the flat files some, if not all, of the applications to function in the event that there is a communication failure with the primary data storage system 24. The system is operable to utilize data from the primary database, in whatever format that data is stored in, and data stored in a flat-file format in the back-up system 26. This also enables the system to switch between databases in such a manner that an operator is not made aware that a shift between the primary and back-up systems has occurred.

Figure 3:
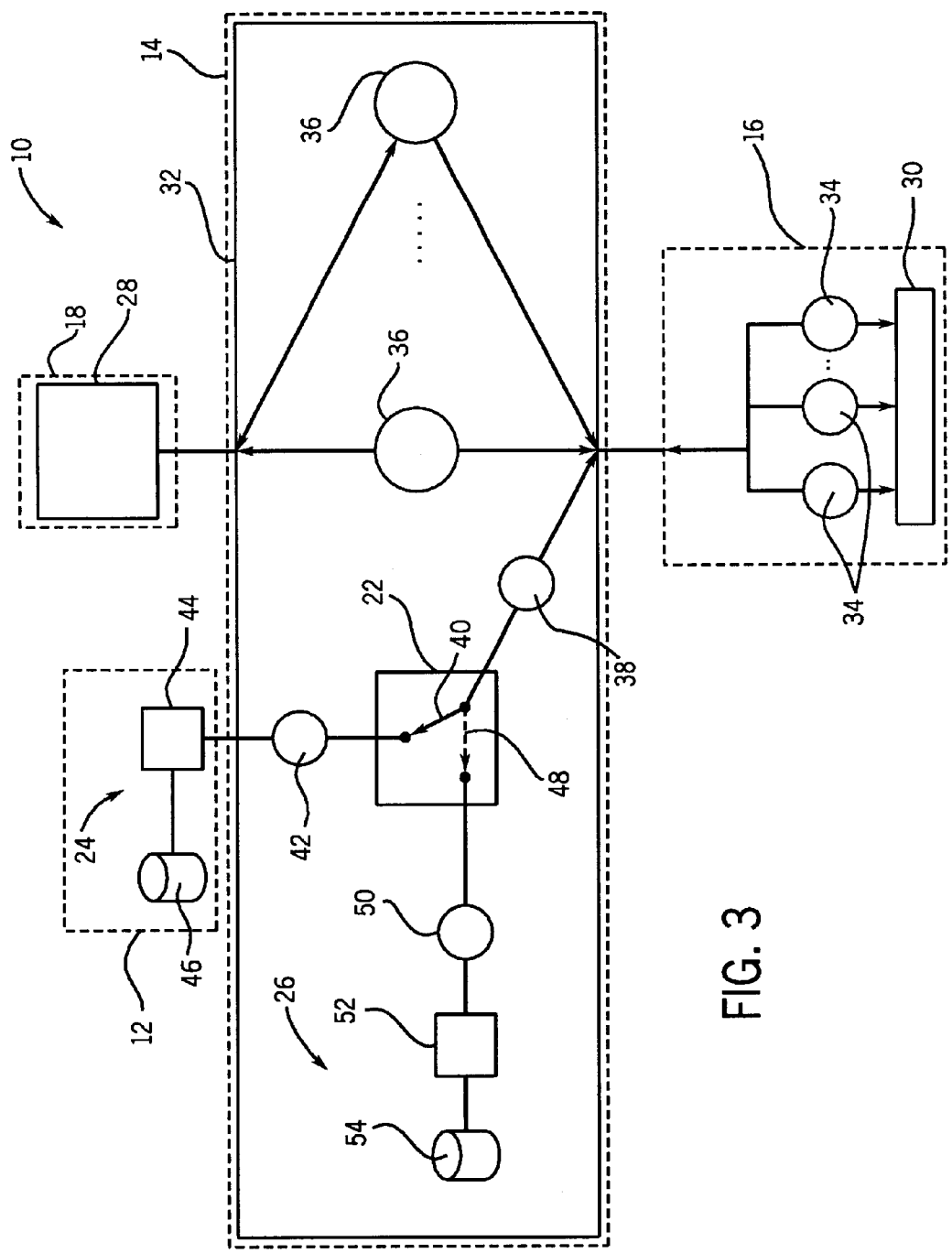
FIG. 3 is a schematic representation of the system of FIG. 1.

Referring generally to FIG. 3, a schematic diagram illustrating the operation of the data access controller 22 is illustrated. The computer system 16 has a plurality of computer applications 30. The local support facility 14 utilizes a server system 32 comprising of one or more servers electronically coupled together to facilitate operation of the applications 30. In an exemplary embodiment, the computer applications include diagnostic tools for remote support of medical imaging systems, such as an application to remotely execute diagnostic tests and identify problems with a medical imaging system. Additionally, the diagnostic tools may include an application that suggests a solution to a problem that has been identified. An application also may be provided to enable an engineer to view data created by the imaging system, such as images, configuration files, logs, etc. An application may also be provided to enable an engineer to remotely operate the imaging system.

In addition to diagnostic tools, the applications may include a word processing program, a form viewer, a web browser, and spreadsheet program. These applications may be used to provide an engineer with any service requests from a customer, copies of service agreements, etc. These applications may also be used to transfer data to the medical imaging system. For example, software may be transferred to the medical imaging system to repair or upgrade the programming. A text editor may be provided to enable the programming on the medical imaging system to be edited or debugged. Many other applications also may be provided.

In this embodiment, the server system 32 and computer system 16 communicate via interface repositories 34 in the computer system 16 and corresponding interface repositories 36 in the server system 32. The interface repositories are used with a backplane (not shown). The backplane is used to launch and maintain applications. The interface repositories de-couple the applications and the controlling system to enable new applications and functionality to be added to the system 10 without having to modify the data access system. For example, the format of the medical imaging data stored in the primary database could be changed without requiring the entire system to be reprogrammed. Additionally, the interface repositories help prevent system crashes by isolating faults and preventing the faults from crashing the entire system. The interface repositories 36 in the server system 32 also are used in communication with the medical imaging system 28 in the customer"s facility 18. Additionally, there is an interface repository 38 that couples the computer system to the data access controller 22. The interface repositories also enable the tools used by an engineer to be platform independent.

In the illustrated embodiment, each data access controller 22 comprises software programming stored on a server at each of the local support facilities 14. Data is coupled through the data access controller 22, the data access controller 22 providing at least two paths for data to flow. In the illustrated embodiment, a first path 40 couples the computer system 16 through an interface 42 to a server 44 in the primary data storage system 24. The server 44 is coupled to a primary database 46. The server system 32 communicates with the server 44 in the primary database system 24 periodically to verify that there is communication with the primary database 46. If communication with the primary database 46 is lost, either through a failure between the primary database 46 and server 44 or between server 44 and server system 32, the data access controller will automatically shift its mode of operation to retrieve data from the back-up data storage system 26. In this event, the data access controller 22 is coupled through an interface repository 50 to a back-up database server 52. The back-up database server 52, is, in turn, coupled to a back-up database 54. In an exemplary embodiment, the data access controller transparently shifts operation from the primary database 46 to the back-up database 54. However, the system 10 may be configured to provide an error message to indicate to a user that data is being retrieved from the back-up data storage system 26, rather than the primary data storage system 24. Additional error messages for other problems may also be passed on to a user.

In an exemplary embodiment, the back-up database 54 is a flat file database. The flat file database contains data to enable the local support facilities 14, or the engineer"s computer systems 16, to connect to the medical imaging systems 28 associated with each local support facility 14, such as the site name and location of each medical imaging system to be connected to a specific local support facility 14, the phone number to access each of the medical imaging systems, and any images downloaded from the medical imaging systems associated with that local support facility 14. The flat file database may be periodically updated with information from the primary database 46. The primary database may be a relational, or object, database, rather than a flat file database. When there is a loss of communication with the primary database, the data access controller changes its mode of operation from retrieving data from a relational, or object, database to retrieving data from a flat file database.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A communication system, comprising:
   a first computer system;
      a primary database coupled to the first computer system;
   a secondary database coupled to the first computer system; and
   a data access controller to automatically shift the first computer system from retrieving data from the primary database to retrieving data from the secondary database when a communication error between the primary database and the first computer system is detected by the system.

2. The system as recited in claim 1, wherein the data access controller is a computer program stored in the first computer system.

3. The system as recited in claim 1, wherein the system transparently shifts from retrieving data from the primary database to retrieving data from the secondary database.

4. The system as recited in claim 1, wherein the primary database is stored on a second computer system coupled to the first computer system.

5. The system as recited in claim 3, wherein the system periodically verifies communication between the first computer system and the primary database.

6. The system as recited in claim 1, further comprising a third computer system coupled to the first computer system, wherein the system enables the third computer system to retrieve data via the data access controller.

7. The system as recited in claim 6, wherein the third computer system comprises an application stored on the third computer system that utilizes data accessed via the data access controller.

8. The system as recited in claim 7, wherein the application comprises a remote tool for an electronic device coupled to the communication system.

9. The system as recited in claim 8, wherein the primary database comprises data to enable the remote tool to identify a problem associated with the electronic device.

10. A communication system, comprising:
   a first computer system;
   a primary database coupled to the first computer system;
   a secondary database coupled to the first computer system, wherein data in the primary database is stored in a first format and data stored in the secondary database is stored in a second format; and
   a data access controller to automatically shift the first computer system from retrieving data from the primary database to retrieving data from the secondary database when a communication error between the primary database and the first computer system is detected by the system.

11. The system as recited in claim 10, wherein the system automatically changes its mode of data transfer to couple data from the primary database using the first format and from the secondary database using the second format.

12. A communication system, comprising:
   a first computer system;
   a medical imaging system coupled to the first computer systems;
   a primary database coupled to the first computer system;
   a secondary database coupled to the first computer system; and
   a data access controller to automatically shift the first computer system from retrieving data from the primary database to retrieving data from the secondary database when a communication error between the primary database and the first computer system is detected by the system.

13. The system as recited in claim 12, wherein the primary database comprises medical images stored in a digital format.

14. The system as recited in claim 13, wherein the secondary database comprises a flat file database of medical imaging system data.

15. The system as recited in claim 1, wherein the system enables the primary database to change data format without affecting operation of the system.

16. The system as recited in claim 15, wherein the primary database and data access controller are coupled via an interface repository.

17. A data access controller, comprising
a computer program stored in a tangible medium, the computer program being operable when stored in a first computer system to direct the first computer system to verify communication with a primary source of data accessible via a second computer system and to direct the first computer system to access data from a secondary source of data when communication between the primary source of data and the first computer system is not verified.

18. The data access controller as recited in claim 17, wherein the computer program directs the first computer system to periodically verify communication with the primary source of data.

19. The data access controller as recited in claim 17, wherein a portion of the computer program is stored in the second computer system to direct the second computer system to periodically communicate with the first computer system to verify communication between the primary database and the first computer system.

20. The data access controller as recited in claim 17, wherein the computer program is operable to couple data from the primary source of data in a first data format and to couple data from the secondary source of data in a second data format.

21. A method of operating a communication system, comprising the acts of:
storing a first set of data in a primary database stored in a first computer system and storing a second set of data in a secondary database;
coupling an application to one of the primary database and the secondary database via a data access controller stored in a second computer system, the data access controller being configured to normally couple the application to the primary database;
verifying communication between the second computer system and the primary database; and
automatically operating the data access controller to couple the application to the secondary database when communication between the second computer system and the primary database is not verified.

22. The method as recited in claim 21, wherein the second set of data is stored in the second computer system.

23. The method as recited in claim 21, further comprising the act of assembling a subset of the first set of data to store in the secondary database as the second set of data.

24. The method as recited in claim 21, wherein coupling an application comprises coupling a third computer system having the application stored within to the second computer system.

25. The method as recited in claim 21, wherein verifying communication comprises periodically establishing communication between the first computer system and the primary database.

26. A method of operating a communication system, comprising:
storing a first set of data in a primary database stored in a first computer system and storing a second set of data in a secondary database, wherein the first set of data is stored in a first data format and the second set of data is stored in a second format, further wherein automatically operating the data access controller comprises changing the mode of operation of the data access controller from transferring data in the first format to transferring data in the second format;
coupling an application to one of the primary database and the secondary database via a data access controller stored in a second computer system, the data access controller being configured to normally couple the application to the primary database;
verifying communication between the second computer system and the primary database; and
automatically operating the data access controller to couple the application to the secondary database when communication between the second computer system and the primary database is not verified.

27. The method as recited in claim 21, wherein the system comprises a plurality of second computer systems coupled to the first computer system, each second computer system having a data access controller.

28. A method of retrieving data comprising:
storing a first database in a first computer system;
coupling a second computer system to the first computer system via a data access controller and a network;
retrieving data from the first computer system via the data access controller and thenetwork; and
retrieving data from a second databases via the data access controller when communication via the network is lost.

29. The method as recited in claim 28, further comprising the act of storing a subset of data from the first database as a flat file in the second database.

30. The method as recited in claim 29, further comprising the act of automatically operating the data access controller to change its mode of operation to transfer data from the flat file in the second database.

31. The method as recited in claim 28, wherein retrieving data comprises retrieving data from the second database when there is a communication error between the second communication system and the first database.

32. The method as recited in claim 31, further comprising the act of providing a system user with an error message when there is a communication error between the first database and the second computer system.

33. The method as recited in claim 28, wherein coupling comprises utilizing interface repositories to couple data.

34. The method as recited in claim 28, further comprising the act of periodically verifying communication between the first computer system and the primary database.

* * * * *